United States Patent [19]

Ono et al.

[11] Patent Number: 4,619,909

[45] Date of Patent: Oct. 28, 1986

[54] PROCESS FOR PRODUCING MONOLITHIC CATALYST FOR PURIFYING EXHAUST GASES

[75] Inventors: Tetsuji Ono, Amagasaki; Shoichi Ichihara, Toyonaka; Tomohisa Ohta, Suita; Sadao Terui, Ibogawa, all of Japan

[73] Assignee: Nippon Shokubai Kagaku Kogyo Co., Ltd., Osaka, Japan

[21] Appl. No.: 699,552

[22] Filed: Feb. 8, 1985

[30] Foreign Application Priority Data

Feb. 10, 1984 [JP] Japan .................................. 59-21872

[51] Int. Cl.$^4$ ........................ B01J 23/10; B01J 23/42; B01J 23/44; B01J 23/46
[52] U.S. Cl. .................................. 502/303; 502/304; 423/213.5
[58] Field of Search ............................. 502/303, 304; 423/213.5

[56] References Cited

U.S. PATENT DOCUMENTS

| 4,231,893 | 11/1980 | Woodhead | 502/304 X |
| 4,331,565 | 5/1982 | Schaefer | 502/304 |
| 4,528,279 | 7/1985 | Suzuki et al. | 423/213.5 X |

FOREIGN PATENT DOCUMENTS

| 56-26547 | 3/1981 | Japan | 502/304 |
| 57-87839 | 1/1982 | Japan . | |
| 57-56041 | 3/1982 | Japan . | |

*Primary Examiner*—W. J. Shine
*Attorney, Agent, or Firm*—Sherman and Shalloway

[57] ABSTRACT

A monolithic catalyst for purification of exhaust gases is produced by a process which comprises coating a monolithic support with an aqueous slurry composition comprising a powder of active alumina, at least one compound of a platinum-group element selected from the group consisting of platinum, palladium and rhodium, and a powder of cerium hydroxide.

12 Claims, No Drawings

PROCESS FOR PRODUCING MONOLITHIC CATALYST FOR PURIFYING EXHAUST GASES

This invention relates to a process for producing a monolithic catalyst for purification of exhaust gases, particularly for the removal of hydrocarbons (to be referred to as HC), carbon monoxide (to be referred to as CO) and nitrogen oxides (to be referred to as $NO_x$), the hazardous components, from exhaust gases. More specifically, this invention relates to a process for producing a monolithic catalyst for purification of exhaust gases, which can simultaneously and stably render HC, CO and $NO_x$ in exhaust gases substantially non-hazardous when an internal combustion engine is operated at an air-fuel ratio near its stoichiometrically equivalent point, and which undergoes little degradation even when exposed to high temperatures of at least 800° C.

So-called three-way catalysts which permit simultaneous removal of three components, HC, CO and $NO_x$, from exhaust gases of internal combustion engines by a single catalytic converter are mounted on some motor vehicles designed for meeting the 1977 U. S. regulations. Recently, the number of such motor vehicles having three-way catalysts mounted thereon has increased partly because of the need to curtail fuel costs. In many cases, such a catalyst is installed at positions below the floor, and in some cases, it is mounted immediately below the engine manifold.

An engine equipped with this three-way catalyst converter discharges exhaust gases from which the above three components have been most effectively removed, when it is operated at a stoichiometrical air-fuel ratio (A/F) or in its vicinity. To make the action of the three-way catalyst more effective, methods are used to control A/F by using a venturi carburetor, or an electronically controlled fuel jetting device adapted to supply fuel by an injection pump so as to maintain a constant A/F. Depending upon the method of control, however, the A/F ratio sometimes varies within a broad range remote from the stoichiomerically equivalent point. Furthermore, in the event of abrupt changes in operation, for example at the time of acceleration or deceleration, the fuel supply is partly or wholly cut off in order to prevent the melting of the monolithic catalyst by the abrupt rise of temperature. Consequently, the catalyst is exposed to a very lean atmosphere.

In other words, the three-way catalyst is not always exposed to exhaust gases discharged during operation at an ideal A/F. When the catalyst is exposed to high temperatures under the aforesaid conditions, its components, especially rhodium and platinum, are susceptible to thermal degradation. It is desired therefore to develop a three-way catalyst which exhibits a stable purifying performance and undergoes little degradation even when the engine is operated at a broad range of A/F. Such a three-way catalyst would be advantageous because the amount of the platinum-group element to be supported can be decreased while maintaining the same purifying performance, and it has been desired to develop catalysts having such a high performance.

It has been well known to use an oxide of cerium as a substance having the ability to store oxygen in combination with the platinum-group element in order to fulfil the above desire. To support the cerium oxide in a well dispersed state, it has been the practice to use a cerium compound in the form of a salt such as cerium nitrate and deposit it on active alumina. The method of supporting cerium in the form of a water-soluble salt such as cerium nitrate on active alumina has the defect of giving a catalyst with inferior durability, particularly durability to heat. Japanese Laid-Open Patent Publication No. 122,044/1983 describes a method in which a material for a catalyst ingredient is used in the form of a carbonate, for example lanthanum is used in the form of lanthanum carbonate. However, when a catalyst composition comprising active alumina and lanthanum carbonate as a catalytically active substance is finely pulverized into a slurry form in an aqueous medium in the presence of a small amount of an inorganic or organic acid, the carbonate radical reacts with the acid radical to increase the thixotropy of the slurry. Consequently, the slurry is difficult to coat smoothly on a support.

It is an object of this invention to provide a process which eliminates the defects of these prior methods.

The present inventors made extensive investigations in order to achieve this object. These investigations have led to the discovery that when cerium hydroxide powder is used as a material for cerium, the resulting catalyst has strikingly increased durability to heat as compared with conventional catalysts prepared by using cerium nitrate and also has increased low-temperature activity, and that particularly when finely divided cerium hydroxide of a specific water content and a specific particle size is used, its dispersibility is well controlled, and in the presence of a small amount of an acid, the resulting catalyst can be finely pulverized into a slurry form to give a good aqueous slurry.

Thus, according to this invention, there is provided a process for producing a monolithic catalyst for purification of exhaust gases, which comprises coating a monolithic support with an aqueous slurry composition comprising a powder of active alumina, at least one compound of a platinum-group element selected from the group consisting of platinum, palladium and rhodium, and a powder of cerium hydroxide.

The use of cerium hydroxide as a cerium compound is known. For example, Japanese Laid-Open Patent Publication No. 87,839/1982 lists cerium hydroxide as a compound which can be used like other cerium compounds such as cerium nitrate.

Japanese Laid-Open Patent Publication No. 56,041/1982 describes a method which comprises washcoating alumina on a carrier and depositing palladium on it, calcining the product, and impregnating the calcined product with an aqueous solution of a cerium salt or a sol of cerium hydroxide. As to the catalyst obtained, however, this patent document only states to the effect that the activity of the catalyst is nearly the same whether the cerium hydroxide sol or the aqueous cerium salt solution is used for impregnation.

U.S. Pat. No. 4,331,565 describes a method which comprises adding a water-soluble salt of cerium to a dispersion of active alumina granules in water, adding aqueous ammonia to precipitate a hydrated oxide of cerium on the surface of alumina, and removing the soluble salt. This method, however, requires filtration and washing, and is complex in steps used, and the resulting catalyst is characterized by the fact that a platinum-group element is supported on active alumina having a cerium oxide surface layer formed thereon.

In short, none of these prior art references disclose the use of the cerium hydroxide powder specified in the present invention, and the catalysts obtained by the prior art are inferior to the catalyst of this invention.

Specific embodiments of the present invention will now be described.

The cerium hydroxide used in this invention is powdery, and has such a particle diameter that its primary particles have a diameter of 0.1 to 0.8 micron, preferably 0.1 to 0.4 micron, and its secondary particles have a diameter of 0.3 to 20 microns, preferably 0.3 to 10 microns. Cerium hydroxide also preferably has a water content of not more than 40% by weight because higher water contents make cerium hydroxide sticky and difficult to handle and renders its particle size distribution too narrow. The water content of cerium hydroxide can be controlled to the desired value in the dehydrating step. The finished catalyst contains 5 to 100 g/liter of catalyst, preferably 20 to 80 g/liter of catalyst, of cerium oxide as $CeO_2$. The amount of cerium hydroxide to be added is 5 to 60% by weight, preferably 10 to 50% by weight, based on active alumina.

Preferably, cerium hydroxide used in this invention has a purity of at least 80%. It may contain lanthanum oxide, neodymium oxide, praseodymium oxide and samarium oxide as impurities. The cerium hydroxide may be used as a mixture with another rare earth such as lanthanum oxide. The amount of the rare earth element compound should have not more than 30% by weight based on the total amount of $CeO_2$ and $La_2O_3$. If the amount of lanthanum oxide becomes larger, the three-way characteristics of the resulting catalyst will be degraded.

The active alumina used in this invention is preferably active alumina having a specific surface area of 50 to 180 $m^2/g$. Aluminum hydroxide, boehmite and hydrated alumina in the form of pseudoboehmite may also be used if they can be converted to the aforesaid active alumina by depositing them on honeycomb carriers and calcining them. Such aluminas should, however, be in the form of alumina of gamma, delta, theta, chi, kappa or eta crystal form in the finished catalyst. The especially preferable alumina is active alumina of the gamma or delta crystal form having a specific surface area of 70 to 160 $m^2/g$. Alumina is deposited in an amount of 50 to 200 g per liter of the catalyst.

The process for producing the catalyst in accordance with this invention is carried out in accordance with the following steps, for example. Active alumina is impregnated with a water-soluble compound of at least one platinum-group metal, for example, platinum (Pt), palladium (Pd) and/or rhodium (Rh), preferably platinum and/or palladium, to support the metal compound directly on the surface layer of alumina. Thereafter, by drying and calcination, or by reducing the platinum-group metal compound with a reducing agent such as hydrazine in the wet state, the platinum-group metal is fixed to alumina. Then, a predetermined amount of cerium hydroxide powder and as required a lanthanum compound are added, and the mixture is subjected to a wet fine pulverizer to prepare a coating slurry. The slurry is coated on a monolithic support, and the excess of the slurry is removed, for example, by blowing it away by an air blower. Thus, predetermined amounts of the catalyst components are supported on the support. The product is then dried and calcined.

As required, at least one other platinum-group metal such as rhodium may be supported in a predetermined amount on the monolithic catalyst composition obtained as above to form a finished catalyst. This may be effected, for example, by a method which comprises impregnating the monolithic catalyst composition with rhodium in the form of its water-soluble compound and as required, calcining the product in air or in a reducing atmosphere or a method which comprises dispersing a rhodium compound in active alumina powder to deposit it on the alumina powder, fixing rhodium to the active alumina, slurrying the product, depositing the resulting slurry in a predetermined amount on the monolithic catalyst composition, drying the product, and as required, calcining the dried product.

A catalyst obtained in accordance with the process of this invention by directly depositing a platinum-group element on alumina having a high specific surface area, mixing it with cerium hydroxide, finely pulverizing the mixture to form an aqueous slurry composition, and coating the composition on a monolithic support has a unique function. Because cerium oxide dispersed and deposited in a large amount in the neighborhood of the platinum-group element has the ability to store oxygen stably, it releases oxygen when the A/F ratio is on the fuel-rich side and thus enhances the ability of the catalyst to remove not only $NO_x$ but also CO and HC, and on the other hand, takes $O_2$ from the ambient atmosphere when the A/F ratio is on the fuel-lean side and thus increases the ability of the catalyst to remove not only CO and HC but also $NO_x$.

Since cerium hydroxide powder is used as a cerium source in this invention, the degree of its dispersion can be made slightly lower than in the case of using cerium nitrate or cerium hydroxide sol. In addition, since cerium is dispersed in a predetermined particle size, the cerium particles hardly grow even when exposed to high temperatures, and therefore, the performance of the catalyst is maintained stable.

If required, it is possible to use a method which comprises first depositing cerium hydroxide together with the platinum-group element fixed to active alumina on a monolithic support, and thereafter, further supporting the same or different kind of platinum-group element in the form of a water-soluble compound.

For example, when there is used a method which comprises depositing and fixing Pt and/or Pd onto active alumina, pulverizing it together with cerium hydroxide to prepare an aqueous coating composition, coating the coating solution on a monolithic support, calcining the product, and impregnating a water-soluble compound of Rh in the resulting catalyst composition, Pt and/or Pd is uniformly dispersed together with active alumina and cerium oxide in the wall of the support, and Rh is distributed near the surface of the catalyst composition. As a result, Rh supported in a small amount contributes effectively to the purifying activity of the catalyst.

Preferably, Rh is deposited by immersing the catalyst supported monolithic carrier for a predetermined period of time in an aqueous solution of the Rh compound made alkaline with aqueous ammonia at pH 6 to 8. This is because this aqueous solution is neutral and therefore Rh can be effectively supported near the surface layer without again dissolving a basic lanthanum oxide or the like. Rhodium chloride is especially preferred as the watersoluble compound of Rh. This compound can be supported at a temperature of not more than 100° C., preferably at ordinary temperature of 5° to 30° C. because the ammonium salt is not discharged out of the system.

When there is employed a method which comprises depositing and fixing Pt and/or Pd onto active alumina, then finely pulverizing it together with cerium hydroxide to form an aqueous slurry compositions, coating the composition on a monolithic support, calcining the product, and depositing on the resulting catalyst composition a predetermined amount of a slurry obtained by depositing and fixing rhodium onto active alumina powder, Pt and/or Pd are dispersed uniformly together with active alumina and cerium oxide in the wall of the support, and Rh is distributed together with active alumina on the surface of the coated wall of the support. According to this method, too, Rh supported in a small amount contributes effectively to the purifying activity of the catalyst. The amount of active alumina used in depositing Rh is 10 to 200 g, preferably 10 to 120 g, per liter of the finished catalyst. The supporting of Rh is not limited to uniform deposition together with Pt and Pd, or to deposition only on the surface layer. For example, in supporting Rh onto the surface layer, a part of Rh may be dispersed together with Pt and Pd. Accordingly, the amount of the Rh compound deposited in the final step in a multi-step depositing method is desirably ½ to 1 times the total amount of the Rh compound supported in the finished catalyst.

The platinum-group element selected from platinum, palladium and rhodium is used in an amount of 0.1 to 5 g per liter of the catalyst. The ratio of Rh to Pt and/or Pd is from 1:100 to 1:1.

In the process of this invention, drying is carried out preferably at a temperature of not more than 200° C., and calcination is carried out at 200° to 900° C., preferably 300° to 700° C.

The honeycomb support having a monolithic structure used in this invention may usually be one called a ceramic honeycomb support made of such a material as cordierite, mullite, alpha-alumina, zirconia, titania, titanium phosphate, aluminum titanate, petalite, spodumene, aluminosilicate and magnesium silicate. Of these, a cordierite honeycomb support is especially preferred for use in internal combustion engines. A monolithic support made of an oxidation-resistant heat-resistant metal such as stainless steel or an Fe-Cr-Al-alloy may also be used. These monolithic supports are produced, for example, by an extrusion molding method, or a method comprising folding and fixing a sheet-like element. Its shape at a gas passage part (cell-type) may be hexagonal, tetragonal, triangular, or corrugated. The cell density (the number of cells/unit cross sectional area) which is sufficiently feasible and gives good results is 150 to 600 cells/inch$^2$.

The following examples illustrate the present invention in greater detail. Needless to say, the present invention is not limited to these examples alone.

EXAMPLE 1

A catalyst was prepared by using a commercial cordierite monolithic support (a product of NGK Insulators Company). The monolithic support was obtained by cutting a support containing about 300 gas-flowing cells per inch$^2$ into a cylindrical shape having an outside diameter of 33 mm and a length of 76 mm, and had a volume of about 65 ml.

Pure water was added to 10.9 ml of an aqueous nitric acid solution of dinitrodiaminoplatinum [Pt(NH$_3$)$_2$(NO$_2$)$_2$] (Pt content 100 g/liter) to adjust the entire volume of the solution to 100 ml. Active alumina powder having a specific surface area of 120 m$^2$/g and an average particle diameter of 50 microns (110 g) was added to the aqeuous solution with stirring. After thorough mixing, the mixture was dried in a dryer at 150° C. for 5 hours, then heated to 600° C. in an electric furnace over the course of 2 hours, calcined at this temperature for 2 hours, gradually cooled, and withdrawn from the furnace. The calcined product was mixed with 66.4 g of hydrous cerium hydroxide powder [Ce(OH)$_4$.4.3H$_2$O] having a primary particle diameter of 0.2 to 0.3 micron and a secondary particle diameter of 1 to 6 microns, and pulverized in the wet state together with dilute aqueous nitric acid solution in a ball mill for 30 hours to prepare a coating slurry.

The monolithic support described above was immersed in the coating slurry, and then taken out of the slurry. The excess slurry in the cells was blown off by compressed air to remove clogging of all of the cells. The catalyst was dried in a dryer at 140° C. for 5 hours, and subsequently calcined in an electric furnace at 600° C. for 2 hours. Eighty milliliters of an aqueous solution obtained by adding pure water to an aqueous solution of rhodium nitrate [Rh(NO$_3$)$_3$.nH$_2$O] (Rh content 5 g/liter) was introduced into a cylindrical vessel having an inside diameter of 35 mm and a height of 200 mm, and the coated monolithic support obtained above was immersed in the aqueous solution. The aqueous solution was stirred to support rhodium. Then, the monolithic support was taken out, and excess water was blown off and it was dried in a dryer at 140° C. for 5 hours to form a finished catalyst.

The total amount of the components supported on the monolithic support was about 151 g/liter of catalyst. The ratio of Al$_2$O$_3$/CeO$_2$/Pt/Rh supported was 110/40/1.09/0.11 (g/liter of catalyst).

COMPARATIVE EXAMPLE 1

A finished catalyst was prepared by nearly the same procedure as in Example 1 except that cerium nitrate was used as a source of ceria instead of cerium hydroxide.

Specifically, 50 ml of pure water was added to 101 g of cerium nitrate [Ce(NO$_3$)$_3$.6H$_2$O] to form an aqueous solution. The aqueous solution was mixed with 10.9 ml of an aqueous nitric acid solution of dinitrodiaminoplatinum (Pt content 100 g/liter). The resulting aqueous solution was fully mixed with 110 g of the same active alumina powder as used in Example 1. The mixture was dried at 150° C., and calcined at 600° C. for 2 hours. The calcined product was pulverized together with dilute aqueous nitric acid in a ball mill to form a coating slurry. The slurry was worked up by the same procedure as in Example 1 to obtain a finished catalyst.

The amount of the components supported on the support was about 151 g/liter of catalyst, and the ratio of the components supported, i.e. Al$_2$O$_3$/CeO$_2$/Pt/Rh, was 110/40/1.09/0.11 (g/liter of catalyst).

EXAMPLE 2

A catalyst of a different composition was prepared by nearly the same procedure as in Example 1 except as noted below. Firstly, an aqueous solution of hexachloroplatinic acid (H$_2$PtCl$_6$) was used as the noble metal source instead of dinitrodiaminoplatinum and deposited on 100 g of active alumina. Secondly, 14.1 g of a powder of hydrous lanthanum hydroxide [La(OH)$_3$.2.2H$_2$O] was used together with 66.4 g of the same hydrous cerium oxide [Ce(OH)$_4$.4.3H$_2$O] as used in Example 1. Thirdly, a predetermined amount of rhodium was supported by using pentaamminetrichlororhodium, [Rh(NH$_3$)$_5$Cl]Cl$_2$ was used instead of the aqueous solution of rhodium nitrate. As a result, a finished catalyst was obtained. The amount of the components supported on the monolithic support was about 151 g/liter of catalyst, and the ratio of the components supported, i.e. $Al_2O_3/CeO_2/La_2O_3/Pt/Rh$, was 100/40/10/1.09/0.11 (g/liter of catalyst).

EXAMPLE 3

Pure water was added to 10.9 ml of an aqueous solution of hexachloroplatinic acid ($H_2PtCl_6$) (Pt content 100 g/liter) and 21.8 ml of an aqueous solution of rhodium chloride ($RhCl_3 \cdot nH_2O$) (Rh content 5 g/liter) to prepare 100 ml of a mixed aqueous solution. Active alumina powder (110 g) was added to the mixed aqueous solution with stirring, and they were thoroughly mixed to deposit the platinum-group metal compounds. Then, 100 ml of a 55% aqueous solution of hydrazine hydrate was added, and the mixture was further stirred to reduce the platinum and rhodium compounds on the alumina particles to fix platinum and rhodium onto the alumina particles. The resulting platinum- and rhodium-supported alumina so obtained was pulverized in the wet state together with 66.4 g of the same hydrous cerium hydroxide powder as used in Example 1 in a ball mill for 30 hours to form a coating slurry. By the same technique as in Example 1, the slurry was wash-coated on the same monolithic support as used in Example 1, and dried at 140° C. for 5 hours to form a finished catalyst.

The amount of the components supported on the monolithic support was about 151 g/liter of catalyst, and the ratio of the components supported, i.e. $Al_2O_3/CeO_2/Pt/Rh$, was 110/40/1.09/0.11 (g/liter of catalyst).

EXAMPLE 4

A catalyst having a different noble metal composition was prepared by the same procedure as in Example 1. Specifically, pure water was added to 7.8 ml of an aqueous nitric acid solution of dinitrodiaminoplatinum (Pt content 100 g/liter) and 3.1 ml of an aqueous nitric acid solution of palladium nitrate [$Pd(NO_3)_2$] (Pd content 100 g/liter) to prepare 100 ml of a mixed aqueous solution. In the deposition of these noble metal compounds on active alumina and in subsequent steps, the same procedure as in Example 1 was carried out except that rhodium was deposited by using an aqueous solution of rhodium chloride instead of rhodium nitrate, and the product was dried in a dryer to form a finished catalyst. The amount of the components supported on the monolithic support was about 151 g/liter of catalyst, and the ratio of the components supported, i.e. $Al_2O_3/CeO_2/Pt/Pd/Rh$, was 110/40/0.78/0.31/0.11 (g/liter of catalyst).

EXAMPLE 5

A catalyst having palladium deposited thereon instead of platinum as a noble metal source was prepared by the same technique as in Example 3. Specifically, a finished catalyst was prepared by the same procedure as in Example 3 except that an aqueous solution of palladium nitrate was used instead of the aqueous solution of hexachloroplatinic acid, and an aqueous solution of rhodium nitrate was used instead of the aqueous solution of rhodium chloride. The amount of the components supported on the monolithic support was about 151/g/liter of catalyst, and the ratio of the components supported, i.e. $Al_2O_3/CeO_2/Pd/Rh$, was 110/40/1.09/0.11 (g/liter of catalyst).

EXAMPLE 6

A catalyst was prepared by nearly the same procedure as in Example 1 using hydrous cerium hydroxide of a different ceria purity.

Pure water was added to 10.9 ml of an aqueous solution of tetraammineplatinum nitrate [$Pt(NH_3)_4](NO_2)_2$] (Pt content 100 g/liter) to form 100 ml of an aqueous solution. The platinum compound was deposited on 106 g of active alumina, and the product was dried and calcined. The calcined product was mixed with 63.5 g of hydrous cerium hydroxide powder having a primary particle diameter of 0.1 to 0.3 micron, a secondary particle diameter of 2 to 5 microns, a ceria purity of 90% (the remainder consisting of 9% of lanthana and 1% of other rare earth oxides), and a water content of 30% (40 g as $CeO_2$, and 4 g as $La_2O_3$), and the mixture was wash-coated on a monolithic support by the same procedure as in Example 1. To deposit rhodium, pentaamminetrichlororhodium as in Example 2 was used. The amount of the components supported on the monolithic support was about 151 g/liter of catalyst, and the ratio of the components supported, i.e. $Al_2O_3/CeO_2/La_2O_3/Pt/Rh$, was 106/40/4/1.09/0.11 (g/liter of catalyst).

EXAMPLE 7

A finished catalyst having a different amount of cerium hydroxide supported thereon was prepared by the same procedure as in Example 6. The amount of the components supported was about 151 g/liter of catalyst, and the ratio of the components supported, i.e. $Al_2O_3/CeO_2/La_2O_3/Pt/Rh$, was 84/60/6/1.09/0.11 (g/liter of catalyst).

EXAMPLE 8

A finished catalyst having a different amount of cerium hydroxide supported thereon was prepared by the same methods as in Examples 6 and 7. The amount of the components supported on the monolithic support was about 151 g/liter of catalyst, and the ratio of the components supported, i.e. $Al_2O_3/CeO_2/La_2O_3/Pt/Rh$, was 128/20/2/1.09/0.11 (g/liter of catalyst).

EXAMPLE 9

Pure water was added to 10.9 ml of an aqueous nitric acid solution of dinitrodiaminoplatinum to form 65 ml of an aqueous solution. Seventy grams of the same active alumina powder as used in Example 1 was added to the aqueous solution with stirring. After thorough mixing, the mixture was dried and calcined. The calcined product was mixed with 42.3 g of the same hydrous cerium hydroxide powder as used in Example 1, and pulverized together with a dilute aqueous solution of nitric acid in a ball mill to prepare a coating slurry. The slurry was wash-coated on a monolithic support by the same procedure as in Example 1. The product was dried at 140° C. for 5 hours and calcined at 600° C. for 2 hours. The amount of the components supported on the monolithic support was 110 g/liter of catalyst.

Separately, pure water was added to 21.8 ml of an aqueous solution of rhodium nitrate to form 35 ml of an aqueous solution. Forty grams of the same active alumina as above was added to the aqueous solution wtih stirring, and they were well mixed to deposit the rhodium compound. The product was dried at 150° C. for 5 hours, and then calcined at 600° C. for 2 hours. The resulting rhodium-supported alumina was pulverized together with a dilute aqueous solution of nitric acid in a ball mill to form a coating slurry. The slurry was wash-coated on the platinum-supported support in a predetermined amount. The product was dried to form a finished catalyst. The amount of the components supported on the monolithic support was about 151 g/liter of catalyst, and the ratio of the component supported, i.e. $Al_2O_3/CaO_2/Pt/Rh$, was 110/40/1.09/0.11 (g/liter of catalyst).

EXAMPLE 10

A monolithic support having an outside diameter of 33 mm, a length of 76 mm and a volume of about 65 ml was cut out from a support made by NGK Insulators Company containing about 400 gas-flowing cells per inch$^2$ of its cross section, and used for catalyst preparation.

A catalyst was prepared by the same procedure as in Example 1. Specifically, active alumina powder having Pt deposited thereon by using an aqueous nitric acid solution of dinitrodiaminoplatinum was calcined, and mixed with the same hydrous cerium hydroxide powder as used in Example 1. The mixture was pulverized in the wet state to prepare a coating slurry. The slurry was coated on the monolithic support, and the product was calcined. Furthermore, rhodium was supported on the calcination product by using an aqueous solution of pentaamminetrichlororhodium to form a finished catalyst. The amount of the components supported on the monolithic support was about 250 g/liter of catalyst, and the ratio of the components supported, i.e. $Al_2O_3/CeO_2/Pt/Rh$, was 190/60/0.417/0.083 (g/liter of catalyst).

COMPARATIVE EXAMPLE 2

A finished catalyst was prepared by the same procedure as in Example 9 except that cerium nitrate was used as a source of ceria. Specifically, an aqueous solution of cerium nitrate was deposited on active alumina powder. The product was then dried at 150° C., and calcined at 700° C. for 2 hours. The calcination product was pulverized in the dry state, impregnated with an aqueous nitric acid solution of dinitrodiaminoplatinum, dried, and then calcined at 600° C. The calcination product was pulverized in the wet state together with a dilute aqueous solution of nitric acid in a ball mill to form a coating slurry. Using the slurry, a finished catalyst was prepared by the procedure as in Example 10. The amount of the components supported on the monolithic support was about 250 g/liter of catalyst, and the ratio of the components supported, i.e. $Al_2O_3/CeO_2/Pt/Rh$, was 190/60/0.417/0.083 (g/liter of catalyst).

EXAMPLE 11

The catalysts prepared in Examples 1 to 9 and Comparative Example 1 were subjected to a bench durability test using engine exhaust gases, and subsequently, their three-way characteristics and light-off characteristics were evaluated by an engine bench test.

A commercial electronically controlled 8-cylinder 4,400 cc engine was used in the bench durability test, and the test was carried out by a mode operating method using a program setter. Specifically, the engine was driven in a normal condition for 60 seconds at an engine rotating speed of 2800 rpm under a boost pressure ($-210$ mmHg). Then, the throttle was returned for 6 seconds, and the fuel supply was stopped. After 6 seconds, the rotating speed of the engine became about 1,800 rpm. During this driving at a decreased speed, the oxygen concentration at the inlet was about 19% and the catalyst was rapidly degraded. In performing the durability test, the catalyst was filled in a multiconverter. The catalyst was aged for 100 hours so that during the normal driving, the inlet temperature was maintained at 850° C., the space velocity (SV) at about 300,000 hr$^{-1}$ (STP), and the A/F ratio at 14.60.

A commercial electronically controlled 4-cylinder 1,800 cc engine was used in evaluating the three-way characteristics and light-off characteristics. The experiment of evaluating the three-way characteristics was a method which modelled the A/F of an actual closed loop-type engine. Forcibly, the A/F was varied at 1 Hz by $\pm 0.5$, and the center of the A/F at this time was varied from 15.1 to 14.1 over 6 minutes. The removal ratios of CO, HC and NO$_x$ at this time were measured. A three-way catalyst characteristic diagram was prepared by plotting the central point of A/F on the abscissa, and the performance of the catalyst was determined on the basis of this diagram. A good catalyst was determined to be one which provided a large height of the crossing point [to be referred to as the crossover point (COP)] of the CO conversion curve and the NO$_x$ conversion curve and had a large A/F width which could achieve 80% conversions simultaneously (80% window).

The catalyst was filled in a multiconverter, and evaluated under the following conditions.

Inlet gas temperature: 400° C.
SV: about 90,000 hr$^{-1}$ (STP)
Catalyst volume: 65 ml The results of the evaluation of the three-way characteristics are shown in Table 1.

It is seen from Table 1 that all of the catalysts of this invention had a high COP and a broad 80% window, whereas the catalyst of Comparative Example 1 had a low COP and was degraded to a condition where no window width existed.

On the other hand, in the experiment of evaluating the light-off characteristics, the A/F was varied forcibly at 1 Hz from 14.10 to 15.10 with 14.60 as a center, and the temperature of the exhaust gas was elevated from room temperature to 450° C. at a rate of about 10° C./min. The purification ratios of CO, HC and NO$_x$ at this time were measured. The purification ratios of the three components were plotted on the ordinate, and the inlet temperature of the catalyst, on the abscissa. From the resulting graph, the low-temperature activity of the three-way catalyst was determined. The catalyst was determined to have better low-temperature activity when the temperatures at which the conversion of the three components all reached 50%, and 80%, respectively (shown in Table 2 as $T_{50}$ and $T_{80}$ respectively).

The results of evaluating the light-off characteristics are shown in Table 2.

It is seen from Table 2 that all of the catalysts of this invention achieved 50% and 80% conversion of the three components at low temperatures and were better than the catalyst of Comparative Example 1.

EXAMPLE 12

The catalysts of Example 10 and Comparative Example 2 were subjected to a bench durability test using engine exhaust gases, and subsequently their three-way characteristics and light-off characteristics were evaluated by a bench engine test. In Example 11, the durability test was conducted by adjusting the inlet temperature to 850° C. during the normal driving. In the present Example, however, the position of the converter was moved away from the engine by about 1 m, the inlet temperature during the normal driving was changed to 750° C., and the durability test was carried out for 100 hours. The results of evaluating the three-way characteristics in this Example are shown in Table 1.

The catalyst of Example 10 had a larger COP and window width than the catalyst of Comparative Example 2.

On the other hand, the results of evaluating the light-off cahracteristics are shown in Table 2. The catalyst of Example 10 had better low-temperature activity than the catalyst of Comparative Example 2.

TABLE 1

| Catalyst | Durability test conditions | Three-way characteristics COP (%) | CO—$NO_x$ 80% window (A/F) |
|---|---|---|---|
| Example 1 | 850° C. × 100 hrs | 83.0 | 0.08 |
| Example 2 | " | 82.0 | 0.08 |
| Example 3 | " | 82.5 | 0.06 |
| Example 4 | " | 81.5 | 0.03 |
| Example 5 | " | 81.0 | 0.02 |
| Example 6 | " | 83.0 | 0.08 |
| Example 7 | " | 82.5 | 0.06 |
| Example 8 | " | 82.0 | 0.06 |
| Example 9 | " | 83.5 | 0.08 |
| Comp. Ex. 1 | " | 64.0 | none |
| Example 10 | 750° C. × 100 hrs | 89.0 | 0.20 |
| Comp. Ex. 2 | " | 83.5 | 0.09 |

TABLE 2

| Catalyst | Durability test conditions | $T_{50}$ (°C.) CO | HC | $NO_x$ | $T_{80}$ (°C.) CO | HC | $NO_x$ |
|---|---|---|---|---|---|---|---|
| Example 1 | 850° C. × 100 hrs | 363 | 372 | 359 | 393 | 396 | 425 |
| Example 2 | 850° C. × 100 hrs | 373 | 380 | 366 | 399 | 402 | 423 |
| Example 3 | 850° C. × 100 hrs | 374 | 380 | 363 | 398 | 401 | 426 |
| Example 4 | 850° C. × 100 hrs | 361 | 369 | 357 | 402 | 406 | 430 |
| Example 5 | 850° C. × 100 hrs | 363 | 371 | 361 | 404 | 408 | 428 |
| Example 6 | 850° C. × 100 hrs | 373 | 381 | 365 | 397 | 401 | 425 |
| Example 7 | 850° C. × 100 hrs | 380 | 384 | 369 | 403 | 406 | 429 |
| Example 8 | 850° C. × 100 hrs | 360 | 370 | 357 | 394 | 397 | 427 |
| Example 9 | 850° C. × 100 hrs | 358 | 367 | 355 | 390 | 395 | 422 |
| Comp. Ex. 1 | 850° C. × 100 hrs | 415 | 420 | 417 | 438 | 441 | (*) |
| Example 10 | 750° C. × 100 hrs | 321 | 324 | 331 | 354 | 359 | 362 |
| Comp. Ex. 2 | 750° C. × 100 hrs | 358 | 363 | 359 | 378 | 380 | 384 |

(*): Did not react at 80%.

What is claimed is:

1. A process for producing a monolithic catalyst for purification of exhaust gases, which comprises depositing at least one compound of a platinum-group element selected from the group consisting of platinum, palladium and rhodium on a powder of active alumina, then fixing the platinum-group element to the active alumina by calcination or reduction, dispersing the resulting material and a powder of cerium hydroxide in water, coating the resulting aqueous slurry composition on a monolithic support, and drying the coating monolithic support.

2. The process of claim 1 wherein the amount of the cerium hydroxide powder supported is 5 to 100 g/liter of catalyst as $CeO_2$.

3. The process of claim 1 wherein the cerium hydroxide powder has a primary particle diameter of substantially 0.1 to 0.8 micron, a secondary particle diameter of substantially 0.3 to 20 microns, and a water content of not more than 40% by weight.

4. The process of claim 1 wherein together with cerium hydroxide, a lanthanum compound other than lantonum carbonate is used in an amount of not more than 30% by weight, as $La_2O_3$, based on the total weight of $CeO_2$ and $La_2O_3$.

5. A process for producing a monolithic catalyst for purification of exhaust gases, which comprises depositing a platinum compound and/or a palladium compound and optionally a rhodium compound on a powder of active alumina, then fixing the platinum-group element or elements to active alumina, dispersing the resulting material and a powder of cerium hydroxide in water, coating the resulting aqueous slurry composition on a monolithic support followed by drying and calcining the coated monolithic support followed by drying and calcining the coated monolithic support and thereafter depositing a rhodium compound on the coated surface of the support followed by drying.

6. The process of claim 5 wherein the rhodium compound is a water-soluble rhodium compound.

7. The process of claim 5 wherein the rhodium compound is deposited by using an ammoniacal alkaline aqueous solution of a water-soluble rhodium compound having a pH in the range of 6 to 8.

8. A process for producing a monolithic catalyst for purification of exhaust gases, which comprises depositing a platinum compound and/or a palladium compound and optionally a rhodium compound on a powder of active alumina, then fixing the platinum-group element or elements to the active alumina, dispersing the resulting material and a powder of cerium hydroxide in water to prepare a first aqueous slurry composition, separately depositing a rhodium compound on a powder of active alumina, then fixing rhodium to the active alumina, dispersing the resulting material in water to form a second aqueous slurry composition, coating the first aqeuous slurry composition on a monolithic support followed by drying and calcining the coated monolithic support and then coating the second aqueous slurry composition on it, followed by drying.

9. The process of claim 8 wherein the amount of rhodium compound deposited in the final step is ½ to 1 times the amount of the rhodium compound supported on the finished catalyst.

10. The process of any one of claims 1, 5 or 8 wherein the fixing of said platinum-group element to said alumina is by means of reduction of said platinum-group element with a reducing agent in a wet state.

11. The process of any one of claims 1, 5 or 8 wherein said platinum-group element is fixed to said alumina and said slurries are fixed to said monolithic support by drying at a temperature of not more than 200° C. and calcining at 200° to 900° C.

12. The process of claim 11 wherein calcination is carried out at 300° to 700° C.

* * * * *

UNITED STATES PATENT AND TRADEMARK OFFICE
CERTIFICATE OF CORRECTION

PATENT NO. : 4,619,909

DATED : October 28, 1986

INVENTOR(S) : Tetsuji Ono, et al.

It is certified that error appears in the above-identified patent and that said Letters Patent is hereby corrected as shown below:

IN THE CLAIMS

Claim 4, line 3, (column 12, line 14),
    delete "lantonum", insert --lanthanum--.

Claim 5, line 9, (column 12, line 25),
    after "support", insert --,--.

Claim 5, lines 10-11, (column 12, lines 26-27),
    delete "followed by drying and calcining the coated monolithic support".

Claim 9, line 1, (column 12, line 53),
    delete "claim 8", insert --claim 5 or 8 --.

Signed and Sealed this

Thirtieth Day of December, 1986

*Attest:*

DONALD J. QUIGG

*Attesting Officer*     *Commissioner of Patents and Trademarks*